US008085254B2

(12) United States Patent
Kato

(10) Patent No.: US 8,085,254 B2
(45) Date of Patent: Dec. 27, 2011

(54) SLIDE OPERATION APPARATUS

(75) Inventor: Kojiro Kato, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 831 days.

(21) Appl. No.: 12/044,357

(22) Filed: Mar. 7, 2008

(65) Prior Publication Data

US 2008/0224994 A1 Sep. 18, 2008

(30) Foreign Application Priority Data

Mar. 12, 2007 (JP) ................................ 2007-061795
Mar. 12, 2007 (JP) ................................ 2007-061796

(51) Int. Cl.
*G09G 5/00* (2006.01)
*G06F 3/033* (2006.01)

(52) U.S. Cl. ...................................... 345/184; 345/156

(58) Field of Classification Search .................. 345/156, 345/184
See application file for complete search history.

(56) References Cited

U.S. PATENT DOCUMENTS

2006/0114221 A1 6/2006 Sakurai et al.
2007/0002488 A1 1/2007 Kato

FOREIGN PATENT DOCUMENTS

| | | | |
|---|---|---|---|
| JP | 49-38761 | | 10/1974 |
| JP | 55-105911 | | 8/1980 |
| JP | H2-24434 | U | 2/1990 |
| JP | 2000-074041 | | 3/2000 |
| JP | 2000-132328 | A | 5/2000 |
| JP | 2002-008907 | | 1/2002 |
| JP | 2003-021541 | | 1/2003 |
| JP | 3102188 | | 7/2004 |
| JP | 2000-049302 | | 2/2006 |
| JP | 2006-209464 | A | 8/2006 |

OTHER PUBLICATIONS

Japanese Office Action mailed Feb. 17, 2009, for JP Application No. 2007-061795, with English Translation, five pages.

*Primary Examiner* — Srilakshmi K Kumar
(74) *Attorney, Agent, or Firm* — Morrison & Foerster LLP

(57) ABSTRACT

A slide operation apparatus capable of preventing a movable unit from being unintentionally moved in a box body, while being easy to assemble and simple in construction. The movable unit includes a gondola to which an operating element is fixed. The gondola is adapted to be movable relative to upper and lower guide bars. A sliding contact assembly includes a plate spring to which an insulation sheet is assembled. The sliding contact assembly in a curved state is mounted to a fixture portion of the operating element by having pawls of the plate spring engaged with notches formed in the fixture portion. During the entire movement process of the movable unit, the curved convex portion of the sliding contact assembly is in sliding contact with the lower guide bar.

5 Claims, 9 Drawing Sheets

SLIDE OPERATION APPARATUS

BACKGROUND OF THE INVENTION

1. Field of the Invention

The present invention relates to a slide operation apparatus having a box body thereof in which a movable unit is disposed for movement when an operating element thereof is operated or manipulated, the slide operation apparatus being used for setting the volume or other parameter in a system mounted with the slide operation apparatus.

2. Description of the Related Art

Conventionally, there has been known a slide operation apparatus such as a fader mounted on a mixer or other system. The slide operation apparatus generally includes a box body in which a movable unit is disposed for movement. The movable unit can be moved, for example, by a user by grasping and manually operating an operating element fixed to the movable unit. The mixer or the like mounted with the slide operation apparatus detects the moving position of the movable unit, and sets the volume or other parameter based on the detected position.

Generally, the movable unit is adapted for movement in the box body longitudinally thereof by being guided by a round bar or other movement guide which is disposed in and longitudinally of the box body.

Also known is a slide operation apparatus capable of adjusting a sliding resistance between the movable unit and the movement guide during movement of the movable unit (Japanese Laid-open Patent Publication No. 2002-8907). This slide operation apparatus includes a squared U-shaped spring disposed to sandwich the movement guide with a sandwiching force appropriately settable by a screw, whereby the sliding resistance (sliding frictional force) can be adjusted.

As described above, however, the slide operation apparatus disclosed in Japanese Laid-open Patent Publication No. 2002-8907 requires the provision of the U-shaped spring and the screw for friction generation, resulting in a complicated construction of the friction generating mechanism, which poses a problem. Another problem is that the friction generating mechanism is not easy to assemble because the U-shaped spring must be mounted such as to sandwich the movement guide, and the screw must be attached.

In recent years, a slide operation apparatus has been known that does not include a brush-type detection device but includes a magnetic detection device or other non-contact detection device for position detection of the movable unit (Japanese Laid-open Patent Publication No. 2006-49302). This type of slide operation apparatus cannot utilize the sliding resistance between the movable unit and the position detection brush for the holding of the movable unit. As a result, the movable unit is freely movable and hence there is a fear that the movable unit is unintentionally moved such as being fallen from its original location depending on the mounting angle of the movable unit relative to the apparatus. To obviate this, the above described friction generating mechanism or other mechanism must be additionally provided to thereby apply an appropriate sliding resistance to the movable unit during the movement thereof.

The movable unit of the slide operation apparatus disclosed in Japanese Laid-open Patent Publication No. 2006-49302 includes a position sensor adapted to output a signal representing the position of the movable unit. A flexible flat cable for transmission of the detected signal is extended from the movable unit to the outside of the apparatus via a guide through hole formed in a housing of the apparatus. This type of slide operation apparatus includes a ground line through which is discharged a high voltage, if any, applied from the operating element operated by a user charged with static electricity.

Recently, a mixer or other signal processing system mounted with a plurality of slide operation apparatuses has been demanded to have a "touch sense function" to permit the mixer or other system to recognize which one of the slide operation apparatuses is currently operated. With the touch sense function, a channel in the mixer corresponding to one of the slide operation apparatuses which is currently operated or manipulated by a user is made active, or the data rewriting is enabled upon operation of the apparatus, for example. To realize the touch sense function, a ham noise detection line, for example, is provided in each of the slide operation apparatuses. The ham noise detection line is at the same electrical potential as the operating element of the slide operation apparatus, and is ungrounded. Upon detection of ham noise generated in the ham noise detection line when the user touches the operating element of any of the slide operation apparatuses, the touching to the currently operated operating element is detected.

On the other hand, however, the operating elements cannot electrically be grounded in order to achieve the touch sense function. In that case, when the user charged with high-voltage static electricity touches any of the operating elements, the slide operation apparatus can erroneously operate or become faulty, which poses a problem.

SUMMARY OF THE INVENTION

The present invention provides a slide operation apparatus capable of preventing a movable unit from being unintentionally moved in a box body, while being easy to assemble and simple in construction.

The present invention provides a slide operation apparatus capable of realizing a touch sense function to recognize a currently operated operating element, while ensuring the provision of a discharge path through which static electricity applied to the operating element can be discharged.

According to a first aspect of this invention, there is provided a slide operation apparatus comprising a box body having a slid portion, a movable unit having engaging portions and held in the box body to be movable longitudinally of the box body, an operating element fixedly mounted to the movable unit and adapted to be operated, and a plate spring having opposite ends thereof formed with engaged portions to correspond to the engaging portions of the movable unit, wherein the plate spring is adapted to be maintained in a curved state by having the engaged portions thereof engaged with the engaging portions of the movable unit, the plate spring having a curved convex portion thereof adapted to be in substantial sliding contact with the slid portion of the box body during movement of the movable unit.

The slide operation apparatus according to the first aspect of this invention can prevent the movable unit from being unintentionally moved in the box body, while being easy to assemble and simple in construction.

In the present invention, the slide operation apparatus can include an elongated movement guide provided as the slid portion in and longitudinally of the box body, the movable unit can be supported for sliding movement by the movement guide, and the curved convex portion of the plate spring can be adapted to be in substantial sliding contact with the movement guide during movement of the movable unit.

In that case, the movement guide has both a guide function and a sliding contact function, making it possible for the slide operation apparatus to have a much simpler and compact construction.

An insulation member can be assembled to the plate spring. The curved convex portion of the plate spring can be adapted to be in sliding contact via the insulation member with the slid portion of the box body.

The slide operation apparatus can include an elongated movement guide provided as the slid portion in and longitudinally of the box body, and the insulation member can have a longitudinally center portion thereof formed with a through hole and disposed at the curved convex portion of the plate spring in contact with the movement guide, and friction can be generated by the contact between the longitudinally center portion of the insulation member and the movement guide, whereby the movable unit can be prevented from being unintentionally moved.

According to a second aspect of this invention, there is provided a slide operation apparatus comprising a box body made of an electrically conductive material and adapted to be grounded, a movable unit held in the box body to be movable longitudinally of the box body, an operating element including an electrically conductive knob and fixedly mounted to the movable unit, the operating element being adapted, when operated, to move the movable unit, a box body-side conductive part fixed relative to the box body and electrically conductive to the box body, a movable unit-side conductive part provided in the movable unit, the movable unit-side conductive part being ungrounded and electrically conductive to the electrically conductive knob of the operating element, and an insulation member provided in one of the box body-side and movable unit-side conductive parts and made in substantial sliding contact with another thereof to maintain a constant close distance between the box body-side and movable unit-side conductive parts during movement of the movable unit.

With the slide operation apparatus according to the second aspect of this invention, a touch sense function to recognize which one of operating elements is currently operated can be realized, while ensuring the provision of a discharge path through which static electricity applied to the operating element can be discharged.

The movable unit-side conductive part can be comprised of a plate spring, and the box body-side conductive part can be comprised of an elongated movement guide adapted to hold the movable unit for movement.

The insulation member can be formed with a through hole to which the movable unit-side conductive part is fitted.

Further features of the present invention will become apparent from the following description of an exemplary embodiment with reference to the attached drawings.

DETAILED DESCRIPTION OF THE PREFERRED EMBODIMENT

The present invention will now be described in detail below with reference to the drawings showing a preferred embodiment thereof.

Figure 1:
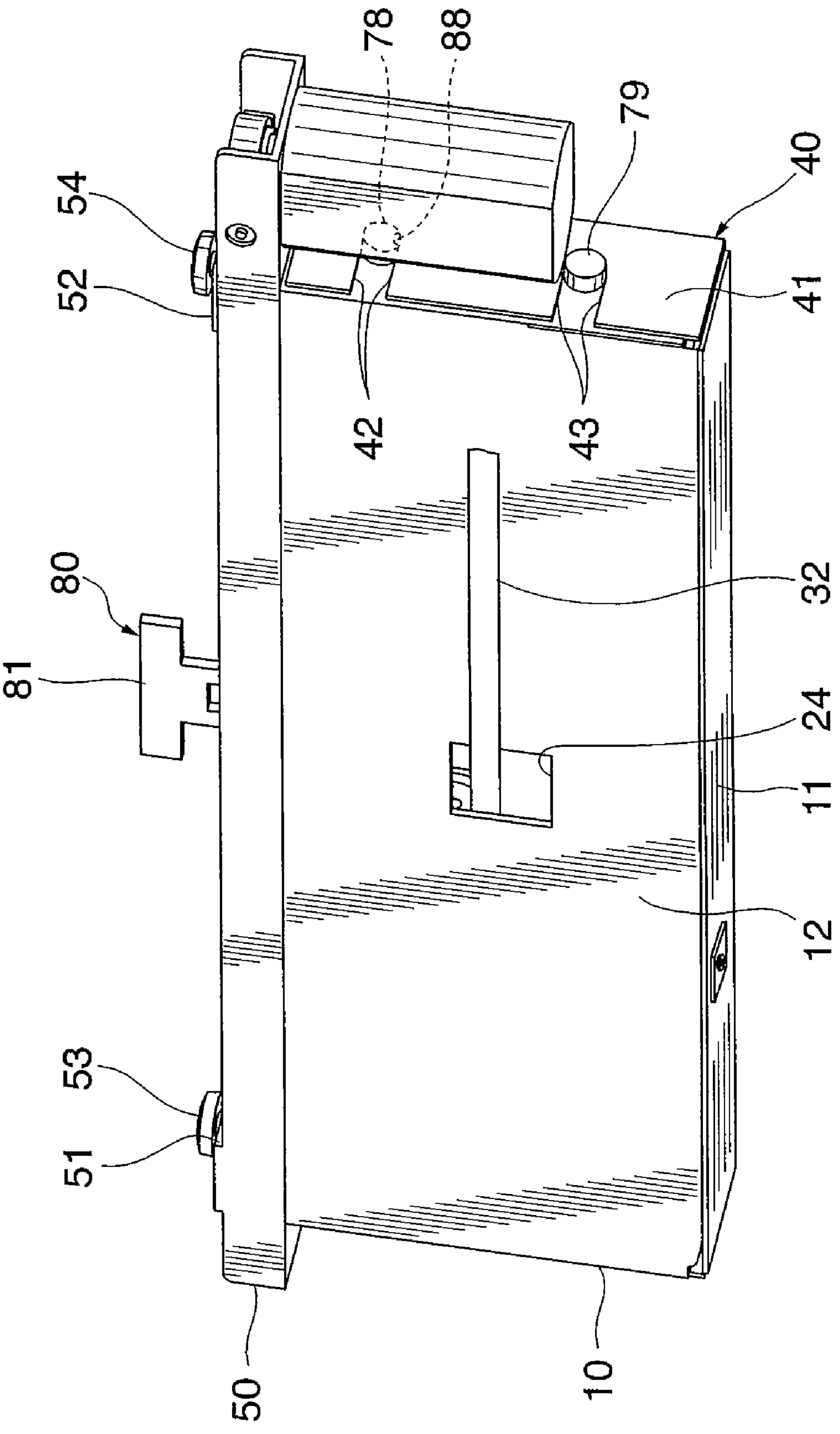
FIG. 1 is a perspective view of a slide operation apparatus according to one embodiment of this invention.
Figure 2:
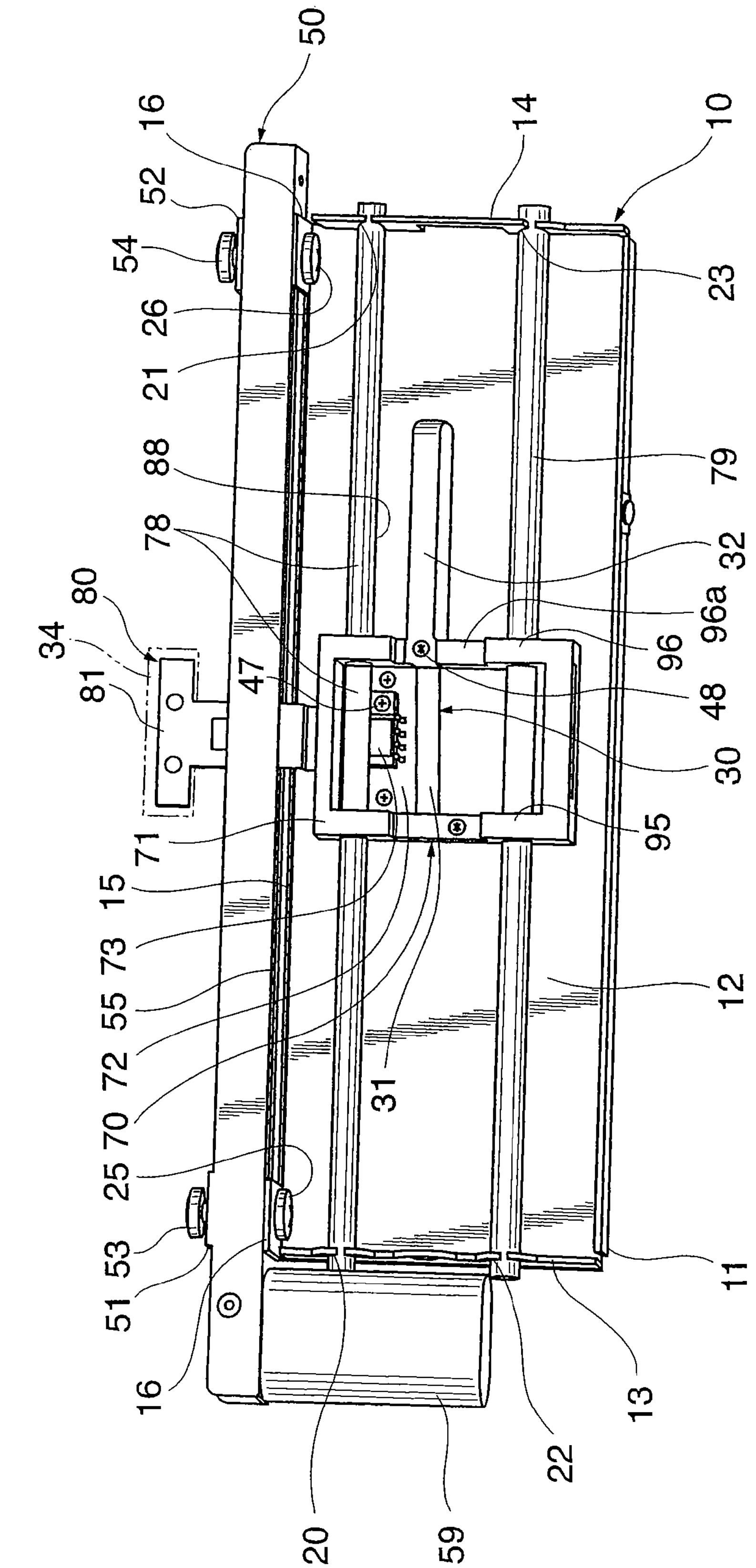
FIG. 2 is a perspective view showing the slide operation apparatus in a state where a sub case is detached therefrom.
Figure 3:
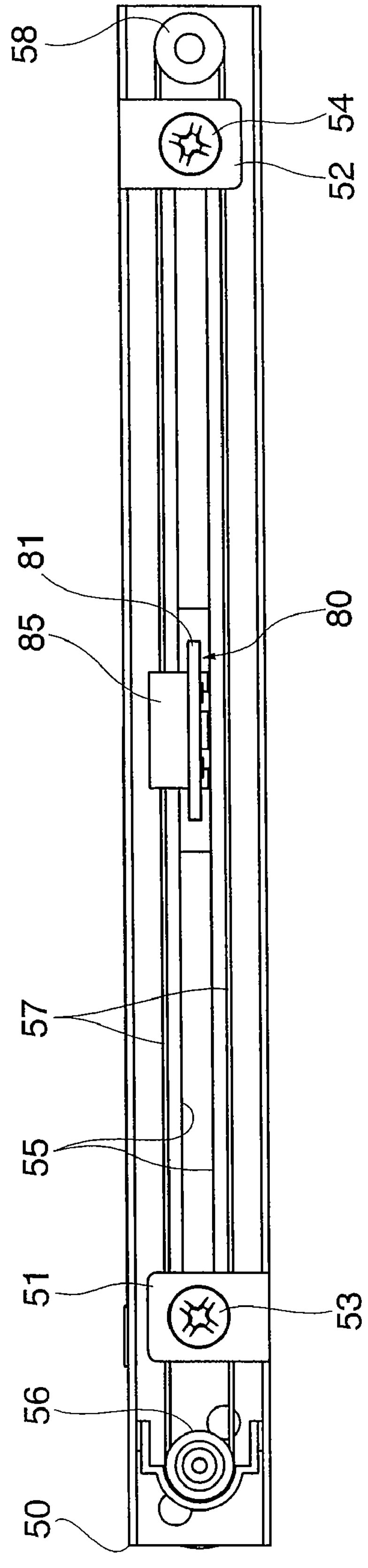
FIG. 3 is a plan view of the slide operation apparatus.

FIG. 1 shows in perspective view a slide operation apparatus according to one embodiment of this invention. The slide operation apparatus includes a box body, which is a housing of the apparatus and comprised of a main case 10 and a sub case 40 adapted to be assembled together. FIG. 2 shows in perspective view the slide operation apparatus, with the sub case 40 detached therefrom. FIG. 3 shows in plan view the slide operation apparatus.

As shown in FIG. 2, a movable unit 70 and upper and lower guide bars 78, 79 which are round bars are disposed within the main case 10 of the slide operation apparatus. An elongated member 50 formed into a squared U-shape in section is provided in an upper portion of the main case 10, and a motor 59 is disposed on one longitudinal end side of the elongated member 50.

Generally, a plurality of slide operation apparatuses are mounted as fader apparatuses in desired orientations to a mixer or other system. For convenience of explanation, vertical and lateral directions referred to hereinbelow are determined as seen from the sub case 40, with a knob 81 of an operating element 80 disposed on the upper side of the apparatus. Specifically, the direction toward the knob 81 is referred to as the "up direction", the direction toward a motor 59 (see FIG. 2) is referred to as the "left direction", and the direction toward the reader viewing FIG. 2 is referred to as the "front direction".

As shown in FIG. 2, the main case 10 is comprised of a bottom plate 11, a main plate 12 disposed on the rear side of the apparatus, a left-side plate 13, a right-side plate 14, and a top plate 15. The top plate 15 has right and left end portions thereof extending forward to form mounting pieces 16 adapted to be mounted with the elongated member 50. The main case 10 is integrally formed by an electrically conductive metal sheet such as a steel plate.

Support holes 20, 21 for holding the upper guide bar 78 are formed on the upper side of the left- and right-side plates 13, 14 of the main case 10, and support holes 22, 23 for holding the lower guide bar 79 are formed on the lower side thereof. As shown in FIG. 1, a cable insertion hole 24 is formed in a longitudinally center portion of the main plate 12 of the main case 10.

As shown in FIG. 2, the elongated member 50 is fixed via the mounting pieces 16 to the main case 10 by screws 25, 26. As shown in FIGS. 2 and 3, a slit 55 along which the operating element 80 is moved is longitudinally formed in a bottom portion of the elongated member 50. Mounting pieces 51, 52 are provided in upper left and right end portions of the elongated member 50. The assembled slide operation apparatus is mounted to a mixer or the like (not shown) by having the mounting pieces 51, 52 fixed by screws 53, 54 to a panel plate of the mixer or the like.

As shown in FIG. 3, a pulley 56 is attached to an output shaft (not shown) of the motor 59 to project from a left end portion of the elongated member 50, and a belt rest pin 58 is provided in a right end portion of the elongated member 50 to project therefrom. A rubber belt 57 is extended between the pulley 56 and the belt rest pin 58. A belt fixture 85 is fixed to the operating element 80, and the rubber belt 57 is fixed at its intermediate portion to the belt fixture 85. When the rubber belt 57 is reciprocated with forward and reverse rotation of the motor 59, the knob 81 of the operating element 80 and the movable unit 70 formed integrally with the operating element 80 are reciprocated in the longitudinal direction of the elongated member 50. For example, upon scene recall operation being performed, a driving current is supplied to the motor 59, whereby the movable unit 70 is automatically driven by the motor 59 to a desired position. Alternatively, the user can move the movable unit 70 to a desired position by manually operating or manipulating the knob 81 of the operating element 80. The knob 81 is made of an electrically conductive material as described later, and covered by a grasped portion 34 made of rubber or the like (see FIG. 2). Upon manual operation, the user can grasp the grasped portion 34 of the knob 81.

The sub case 40 (see FIG. 1) is integrally formed by a resin into a squared U-shape as viewed in plan. The sub case 40 is assembled to the main case 10 by having engagement portions, not shown, of these cases engaged by snap fitting with one another. As shown in FIG. 1, the left plate 41 of the sub case 40 is formed with notches 42, 43 to respectively correspond to the upper and lower guide bars 78, 79. Although not shown, the sub case 40 has its right plate constructed similarly to and symmetrically with the left plate 41.

As shown in FIG. 2, a circuit board 72 is mounted to the movable unit 70. For example, the circuit board 72 is attached by screws or the like to a front surface of a rear portion 71*a* of the gondola 71 of the movable unit 70 (see FIG. 4B). A magnetic sensor 73 comprised of, for example, an IC including a hall element is disposed on a front surface of the circuit board 72.

Furthermore, a flat cable 30 is attached to the circuit board 72. The flat cable 30, which is disposed in the main case 10, includes a cable proximal portion 31 thereof fixed to the circuit board 72 and an extended portion 32 thereof extending from the cable proximal portion 31. The extended portion 32 is extended rightward from the cable proximal portion via a cable run-off portion 96*a* of a right wall 96 of the gondola 71, and is then folded back leftward to extend to the outside via a cable insertion hole 24 (see FIG. 1). The folded-back position of the extended portion 32 changes depending on the moving position of the movable unit 70 in the left-to-right direction to follow the movement of the movable unit 70.

Figure 4A:
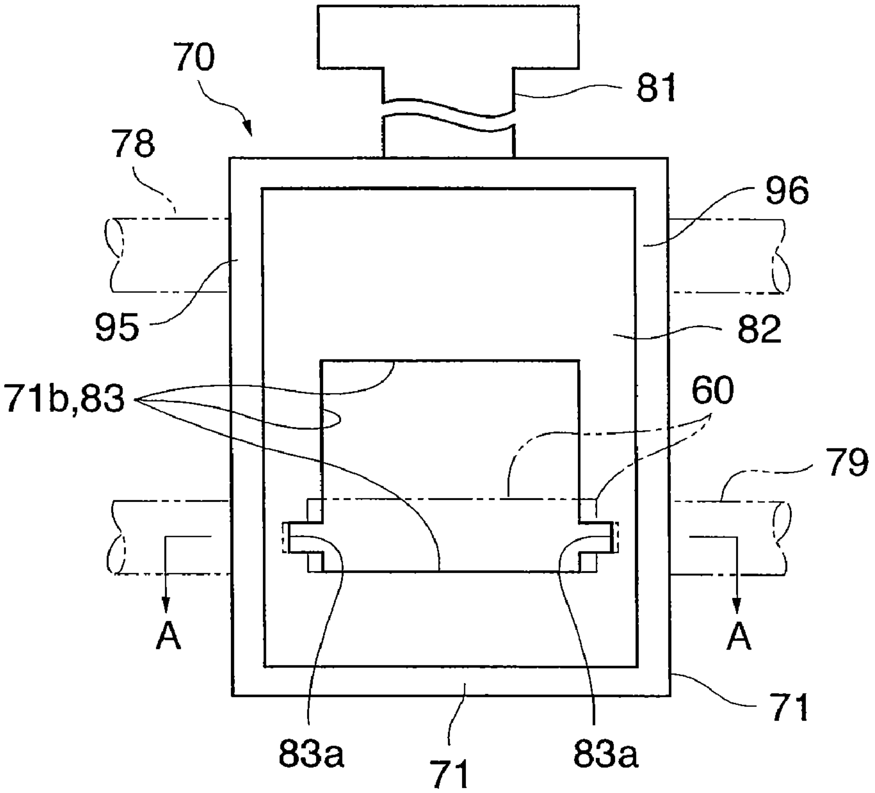
FIG. 4A is a schematic view of a movable unit of the slide operation apparatus as seen from front.
Figure 4B:
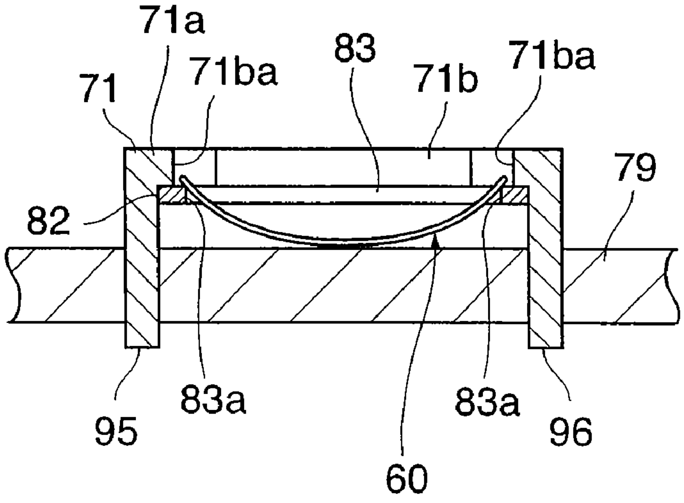
FIG. 4B is a section view taken along line A-A shown in FIG. 4A.

FIG. 4A schematically shows the movable unit 70 as seen from front. FIG. 4B is a section view taken along line A-A in FIG. 4A. In FIG. 4A, an illustration of the circuit board 72 and the sensor 73 is omitted.

As shown in FIGS. 4A and 4B, the movable unit 70 includes the gondola 71 made of resin and formed into a rectangular box shape having an open front side, and the operating element 80 is fixed to the gondola 71. The operating element 80 includes the knob 81 formed into a T-shape as seen from front, and includes a fixture portion 82 disposed below the knob 81 and having a rectangular outer shape as seen from front. The operating element 80 is integrally formed by an electrically conductive material. The fixture portion 82 is fixed to the gondola 71 by being outsert-molded or bonded thereto, for example.

The gondola 71 has its left and right walls 95, 96 each formed with one upper through hole and one lower through hole extending therethrough in the left-to-right direction. The upper guide bar 78 extends through the upper through holes, and the lower guide bar 79 extends through the lower through holes, whereby the gondola 71 can slidably be moved relative to the upper and lower guide bars 78, 79. Thus, the movement of the gondola 71 is guided by the guide bars 78, 79.

A mechanism for detecting the position of the movable unit 70 is provided, which is similar to a known mechanism disclosed in Japanese Laid-open Patent Publication No. 2006-49302. Specifically, as shown in FIG. 2, the upper guide bar 78 is formed at its lower surface with a magnetic pole surface 88 over substantially the entire longitudinal length thereof. The magnetic pole surface 88 is magnetized alternately with N and S magnetic poles. The upper guide bar 78 is formed into a circular shape in section with a flat lower surface. Thus, a lower surface of the magnetic pole surface 88, corresponding to the lower surface of the upper guide bar 78, is formed into a flat surface. The position of the gondola 71 in the upward-to-downward and forward-to-rearward directions is restricted by the upper guide bar 78. Thus, a movement locus of the gondola 71 is restricted by the upper guide bar 78, whereby a stable movement of the movable unit 70 is ensured and the accuracy of position detection of the movable unit 70 is enhanced.

Although not shown, a whirl-stop mechanism for the upper guide bar 78 is provided at an appropriate portion of the box body, which is a housing of the slide operation apparatus, whereby the magnetic pole surface 88 of the upper guide bar 78 can always be directed downward. The whirl-stop mechanism can be realized, for example, by forming the above described through hole, not shown, of the gondola 71 through which the upper guide bar 78 extends or the support holes 20, 21 of the main case 10 to have a sectional shape similar to that of the upper guide bar 78, which is circular in section with the flat lower surface. The sensor 73 (see FIG. 2) is disposed beneath the upper guide bar 78 to face the magnetic pole surface 88 of the upper guide bar 78, with a slight gap (clearance) between the sensor 73 and the magnetic pole surface 88.

With movement of the movable unit 70, the sensor 73 is moved relative to the magnetic pole surface 88 of the upper guide bar 78 and outputs a pulse signal each time the sensor 73 passes through a boundary between N and S poles of the magnetic pole surface 88. Based on the number of pulse signals, an amount of movement of the movable unit 70 can be detected. The magnetic poles formed on the magnetic pole surface 88 are arranged, for example, in two rows. The magnetic poles disposed in one of the rows are shifted by $\pi/2$ in terms of phase relative to those disposed in another row in the longitudinal direction of the upper guide bar 78, and two series of pulse signals which are shifted in phase are output from the sensor 73. Thus, the moving direction (right or left) of the movable unit 70 can be detected based on the direction of the phase shift in pulse signals. The current position of the movable unit 70 is detected based on the detected amount and direction of movement and position information indicating a position before movement and stored in a control circuit of the mixer, not shown. Needless to say, the movement of the movable unit 70 can be detected by the sensor 73 even when the movable unit is manually moved.

As shown in FIG. 2, the upper and lower guide bars 78, 79 with which the gondola 71 is engaged are supported by having opposite end portions thereof inserted through support holes 20 to 23 of the main case 10. The upper guide bar 78 is disposed such that the magnetic pole surface 88 is directed downward.

As shown in FIGS. 4A and 4B, a hole **71*b* is formed in a rear portion 71*a* of the gondola 71, and a hole 83 corresponding to the hole 71*b* is formed in the fixture portion 82 of the operating element 80. A pair of left and right notches 83*a* (engaged portions) are formed in the fixture portion 82 of the operating element 80 in communication with the hole 83 at a vertical position where the lower guide bar 79 is disposed. Run-off portions 71*ba* (engaging portions) corresponding to the notches 83*a* are formed in the rear portion 71*a* of the gondola 71 in communication with the hole 71*b*. A sliding contact assembly 60 is interposed between the lower guide bar 79 and the fixture portion 82 of the operating element 80. The sliding contact assembly 60 is engaged with and mounted to the fixture portion 82**.

Figure 5A:
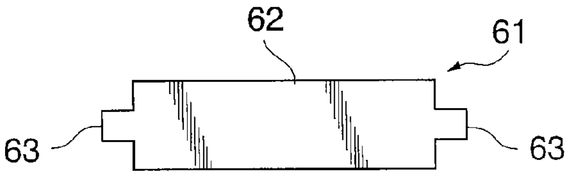
FIG. 5A is a front view of a plate spring, which is a part of the sliding contact assembly of the slide operation apparatus.
Figure 5B:
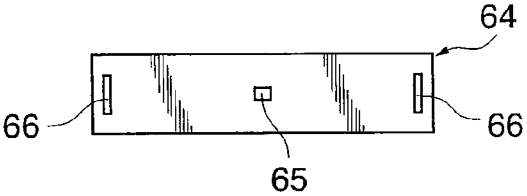
FIG. 5B is a front view of an insulation sheet, which is a different part of the assembly.
Figure 5C:
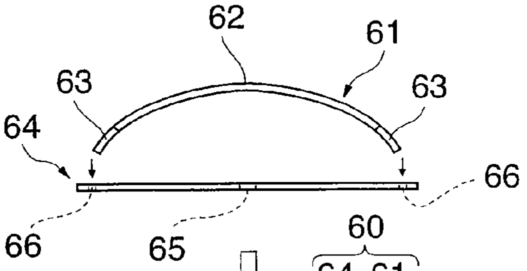
FIGS. 5C and 5D are schematic views showing how the sliding contact assembly is assembled and how the assembly is mounted to a fixture portion of an operating element of the sliding operation apparatus.
Figure 5D:
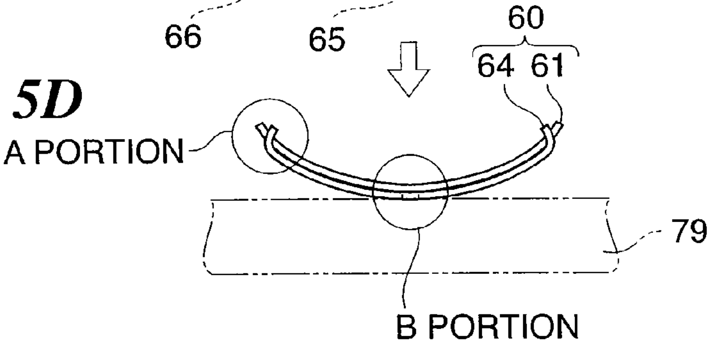

FIGS. 5A and 5B respectively show in front view a plate spring 61 and an insulation sheet 64 of the sliding contact assembly 60. FIGS. 5C and 5D schematically show how the sliding contact assembly 60 is assembled and is engaged with and mounted to the fixture portion 82 of the operating element 80.

The sliding contact assembly 60 is comprised of the plate spring 61 and the insulation sheet 64 which are assembled together. The plate spring 61 is made of an electrically conductive metal, and includes a barrel portion 62 thereof formed at its longitudinal opposite ends with pawls 63. The plate spring 61 per se has a peculiar of being curved (being convex upward in the example shown in FIG. 5C) in a free state, and has such a characteristic that an inversely curved state can be attained by being pressed at its convex side and can be stably maintained thereafter. It should be noted that the plate spring 61 may be flat in a free state.

The insulation sheet 64 is integrally formed by an insulating material such as resin. As shown in FIG. 5B, the insulation sheet 64 has its longitudinally opposite end portions formed with a pair of engagement holes 66 corresponding to the pawls 63 of the plate spring 61, and has its longitudinally center portion formed with a through hole 65 for electric discharge. To assemble the sliding contact assembly 60, as shown in FIG. 5C, a concave side of the plate spring 61 is made to face the insulation sheet 64, and in this state, the pawls 63 of the plate spring 61 are inserted into the engagement holes 66 of the insulation sheet 64. Then, a convex side of the plate spring 61 is pressed to reverse the direction of curvature of the plate spring 61, whereby the new convex side of the plate spring 61 is made in close contact with the insulation sheet 64. As a result, the insulation sheet 64 and the plate spring 61 are made integral together.

Figure 5E:
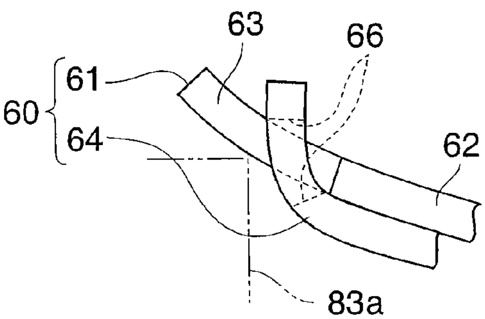
FIG. 5E is an enlarged view of an A portion shown in FIG. 5D.
Figure 5F:
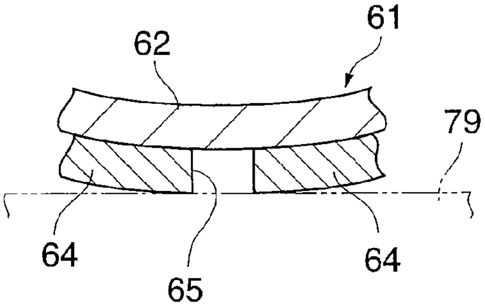
FIG. 5F is an enlarged view of a B portion shown in FIG. 5D.

FIGS. 5E and 5F show in enlarged scale an A portion and a B portion in FIG. 5C, respectively. The assembled sliding contact assembly 60 is mounted to the gondola 71 before the upper and lower guide bars 78, 79 are inserted into the gondola 71. Specifically, as shown in FIGS. 4B and 5D, the pawls 63 of the plate spring 61, which project from the engagement holes 66 of the insulation sheet 64, are inserted for engagement into notches **83*a*, which are in communication with the holes 83 of the fixture portion 82 of the operating element 80, whereby the sliding contact assembly 60 in a curved state is mounted to the fixture portion 82. Subsequently, the upper and lower guide bars 78, 79 are inserted into the gondola 71**.

The sliding contact assembly 60 mounted to the fixture portion 82 is curved to an extent that it is in contact with the lower guide bar 79. Specifically, a longitudinally center part (where the through hole 65 is formed) of the insulation sheet 64 is a convex portion of the sliding contact assembly 60 and in contact with the lower guide bar 79 (see FIG. 5E). The contact between the insulation sheet 64 and the lower guide bar 79 is maintained even during movement of the movable unit 70. Thus, during the entire movement process of the movable unit 70, the sliding contact assembly 60 is in sliding contact with the lower guide bar 79. As a result, a desired friction is generated, whereby the movable unit 70 is prevented from being unintentionally moved. Due to the interposition of the insulation sheet 64 between the plate spring 61 and the lower guide bar 79, the plate spring 61 per se is kept out of contact with the lower guide bar 79 during the entire movement process of the movable unit 70. However, the plate spring 61 is disposed close to the lower guide bar 79 with a constant distance corresponding to the thickness of the insulation sheet 64 (equal to or less than about 100 μm) The plate spring 61 and the lower guide bar 79 are disposed close to each other especially at the through hole 65, without any element interposed therebetween.

A friction force produced between the sliding contact assembly 60 and the lower guide bar 79 is determined depending on the degree of curvature and length of the sliding contact assembly 60, the spring constant of the plate spring 61, and so on. For example, the friction force is set to have a magnitude that permits the movable unit 70 to be retained at its original location without being fallen therefrom, even when the slide operation apparatus is mounted to the mixer with the lower guide bar 79 vertically disposed.

Figure 6A:
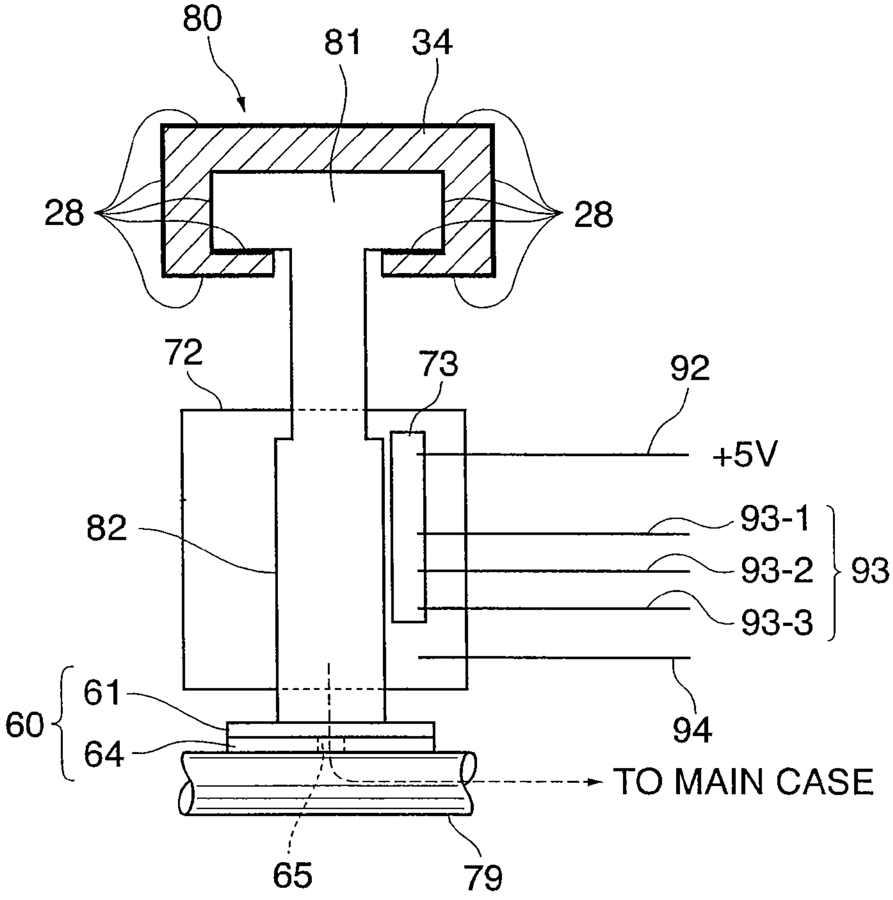
FIG. 6A is a schematic view showing wiring connections around the operating element and a circuit board of the slide operation apparatus.

FIG. 6A schematically shows electrical wiring connections around the operating element 80 and the circuit board 72. In FIG. 6A, the grasped portion 34 of the operating element 80 is shown in section. As described above, the knob 81 is covered by the grasped portion 34 made of rubber or the like (see FIG. 2). As shown in FIG. 6A, the grasped portion 34 is fitted and fixed to the knob 81. An electrically conductive plating 28 is continuously formed not only on an outer surface of the grasped portion 34 which is directly grasped for operation by a user but also on an inner surface thereof which is in contact with the knob 81. Thus, the surfaces of the grasped portion 34 are electrically conductive to the fixture portion 82 of the operating element 80 via the knob 81.

In the slide operation apparatus, there are provided a power supply line 92, three signal lines 93 (93-1 to 93-3) for transmission of signals output from the sensor 73, and a ham noise detection line 94. These lines 92 to 94 are contained in the flat cable 30 shown in FIG. 2, and disposed parallel to the longitudinal direction of the extended portion 32 of the cable 30.

In the circuit board 72, the power supply line 92 and the three signal lines 93 are connected to the sensor 73. When the slide operation apparatus is in use, a voltage of +5 V is applied to the power supply line 92. Pulse signals output from the sensor 73 are drawn via the signal lines 93, whereby the current position of the movable unit 70 is detected. The ham noise detection line 94 is electrically connected via a connection line, not shown, to the fixture portion 82, whereby the line 94 and the fixture portion 82 are always at the same potential.

In an electrical path formed by the electrically conductive plating 28, the knob 81, the fixture portion 82, the sliding contact assembly 60, the lower guide bar 79, and the main case 10, there is an electrically insulative part, which extends over a distance corresponding to the thickness of the insulation sheet 64, only between the plate spring 61 of the sliding contact assembly 60 and the lower guide bar 79, as described above. That part of the electrical path extending from the electrically conductive plating 28 of the operating element 80 to the plate spring 61 is in an electrically conductive state and is ungrounded. On the other hand, the main case 10 is electrically grounded via the mixer on which if the slide operation apparatus is mounted. The lower guide bar 79 is also grounded since the lower guide bar 79 is always in contact with the main case 10.

Figure 6B:
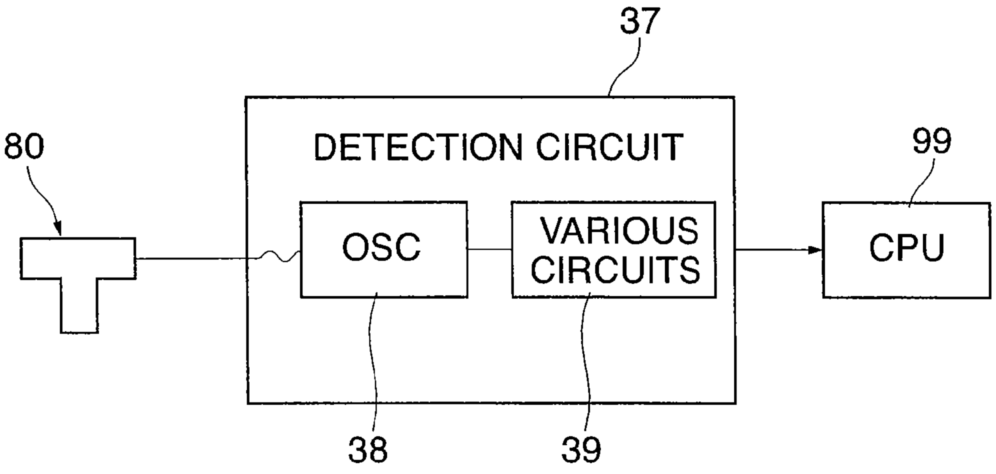
FIG. 6B is a block diagram showing a touch detection circuit in the circuit board that realizes a touch sense function.

FIG. 6B shows in block diagram a touch detection circuit in the circuit board 72 that realizes a touch sense function. A plurality of the slide operation apparatuses which are similar in construction can be mounted to the mixer (not shown). The touch sense function is a function to cause the mixer to recognize which one of the slide operation apparatuses is currently operated. Based on the touch sense function, when the grasped portion 34 of the operating element 80 of any of the slide operation apparatuses is grasped for operation by a user, a channel in the mixer corresponding to the currently operated apparatus is made active, or a data rewriting operation is performed in the mixer upon the apparatus being operated, for example. In the mixer, it is determined that there is a touch state when the user touches the grasped portion 34 of the operating element 80 of any of the apparatuses, whereas there is a non-touch state when the user takes his/her fingers off the grasped portion 34 thereof.

A touch detection circuit 37 is provided in each of the slide operation apparatuses, and a CPU 99 is provided in the mixer. The touch detection circuit 37 includes an OSC (oscillator) 38 that generates a sinusoidal wave signal, and various circuits 39 including a full-wave rectifier, a differential amplifier, an A/D converter, etc., which are not shown individually.

As shown in FIG. 6A, the operating element 80 (more specifically, the grasped portion 34 thereof) of each of the slide operation apparatuses is connected with high impedance to the lower guide bar 79. Thus, the ham noise detection line 94, which is at the same potential as the electrically conductive plating 28 of the grasped portion 34, is liable to pick up ham noise generated when the user touches the grasped portion 34 of the operating element 80 of the slide operation apparatus. By detecting the ham noise, the touching to the operating element 80 of the slide operation apparatus is detected.

Specifically, when the user touches the operating element 80 (more specifically, the grasped portion 34 thereof), there is produced a change in the electrostatic capacitance of a system, including the user's body to the ham noise detection line 94, due to the presence of resistance and capacitance of the user's body, thereby changing the amplitude level of output of an LPF (low pass filter), not shown, in the OSC 38 (see FIG. 6B). The change in amplitude is detected by the various circuits 39 from which a change signal is output to the CPU 99 of the mixer. Based on the change signal, the CPU 99 can recognize the touch/non-touch state of each of the slide operation apparatuses mounted on the mixer.

With the above described arrangement, when the user charged with static electricity operates or manipulates the operating element 80, a high voltage is instantaneously applied to the plate spring 61 via the electrically conductive plating 28 of the grasped portion 34, the knob 81, and the fixture portion 82 of the operating element 80. If an excessively high voltage (for example, equal to or higher than 5 kV) is applied to the plate spring 61, a spark is generated in the through hole 65 between the plate spring 61 and the lower guide bar 79, and is discharged via the lower guide bar 79 and the main case 10.

According to the present embodiment, during the entire movement process of the movable unit 70, the curved convex portion of the plate spring 61 of the sliding contact assembly 60 is in sliding contact with the lower guide bar 79. Due to the friction between the convex portion of the plate spring 61 and the lower guide bar 79, the movable unit 70 is prevented from being unintentionally moved within the box body of the apparatus no matter what posture the slide operation apparatus takes. Furthermore, the sliding contact assembly 60 comprised of the plate spring 61 and the insulation sheet 64 (see FIG. 5C) is mounted to the fixture portion 82 of the operating element 80 by having the pawls 63 of the plate spring 61 engaged with the notches 83*a* formed in the fixture portion 82 (see FIGS. 4B and 5D). Thus, it is unnecessary to fix the assembly 60 to the operating element 80 by screws or the like, making it possible to simplify construction, reduce costs, and achieve ease of assembly.

In particular, the sensor 73 which is of a non-contact type does not produce physical resistance to the movement of the movable unit 70, and is thus suitable for use with a friction generating mechanism comprised of the sliding contact assembly 60. It should be noted that the sensor 73 can be of any type other than a non-contact type including a magnetic or optical sensor.

A combination of the sliding contact assembly 60 and the lower guide bar 79 achieves both the movement guiding function for the movable unit 70 and the braking function based on sliding contact, thereby preventing the construction from being complicated and easily making the apparatus compact.

Moreover, according to the present embodiment, the plate spring 61 of the sliding contact assembly 60 is always out of contact with the lower guide bar 79 during the entire movement process of the movable unit 70, making it possible to realize a touch sense function. In addition, during the entire movement process of the movable unit 70, the insulation sheet 64 of the sliding contact assembly 60 is in sliding contact with the lower guide bar 79 so that the plate spring 61 is always disposed close to the lower guide bar 79 with a constant distance corresponding to the thickness of the insulation sheet 64. As a result, a discharge path through which static electricity applied to the operating element 80 can be discharged is always ensured by the through hole 65 formed in the insulation sheet 64, making it possible not only to realize the touch sense function but also to reduce a fear of erroneous action and faulty of the apparatus caused by a high voltage generated when a user charged with high-voltage static electricity touches the operating element 80 of the apparatus.

Various modifications can be made as described below with reference to FIGS. 7A to 9D.

Figure 7A:
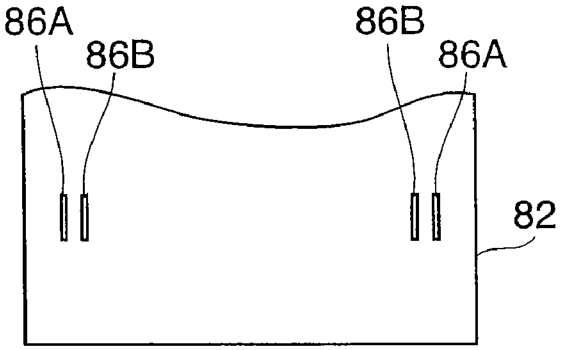
FIG. 7A is a fragmentary front view showing a fixture portion of an operating element according to a first modification of the embodiment.
Figure 7B:
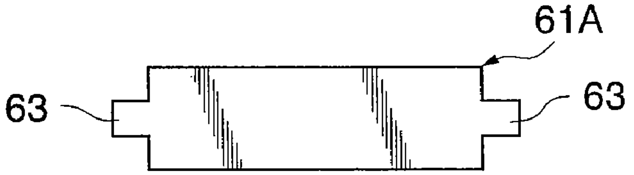
FIG. 7B is a front view of a plate spring of a sliding contact assembly of the first modification.
Figure 7C:
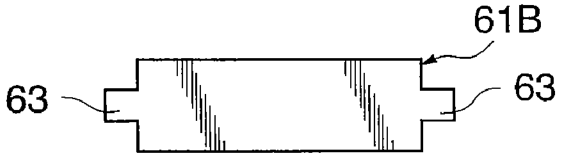
FIG. 7C is a front view showing a plate spring which is different in length from the plate spring shown in FIG. 7B.
Figure 7D:
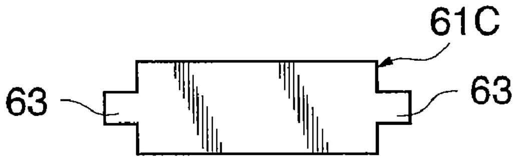
FIG. 7D is a front view showing a plate spring which is different in length from the plate springs shown in FIGS. 7B and 7C.

FIGS. 7A to 7D show an operating element 80 and a sliding contact assembly 60 according to a first modification. FIG. 7A shows in fragmentary front view the fixture portion 82 of the operating element 80, and FIGS. 7B to 7D respectively show in front view plate springs 61A to 61C which are different in length from one another. As shown in FIGS. 7B to 7D, there are prepared a plurality of types (for example, three types) of plate springs 61A to 61C which are different in length from one another. As shown in FIG. 7A, the fixture portion 82 of the operating element 80 is formed with two pairs of engagement holes 86A, 86B. Then, a desired one of the plate springs 61A to 61C is selected as the plate spring 61 to be attached to the fixture portion 82 of the operating element 80, and pawls 63 of the selected plate spring 61 are engaged with either the pair of engagement holes 86A or another pair of engagement holes 86B, whereby the degree of curvature of the plate spring 61, i.e., the intensity of contact between the assembly 60 and the lower guide bar 79 can be adjusted, making it possible to adjust the resultant friction force. In this modification, a six-stage adjustment can be performed by selecting the plate spring 61 from among the three types of plate springs 61A to 61C and selecting one pair of engagement holes 86 from among the two pairs of engagement holes 86A, 86B. The number of types of plate springs and the number of pairs of engagement holes are not limitative thereto. More than three types of plate springs can be prepared and more than two pairs of engagement holes can be formed in the fixture portion 82 of the operating element 80.

In the above described embodiment, the insulation sheet 64 of the sliding contact assembly 60 functions to maintain a constant close distance between the plate spring 61 and the lower guide bar 79. Only from the viewpoint of ensuring the provision of the discharge path, however, the electrically conductive part to be kept apart at a constant distance from the lower guide bar 79 is not limitative to the plate spring 61, but may be any electrically conductive part which is at the same potential as the conductive plating 28 of the operating element 80 (see FIG. 6A) and disposed on the side of the movable unit 70.

Figure 7E:
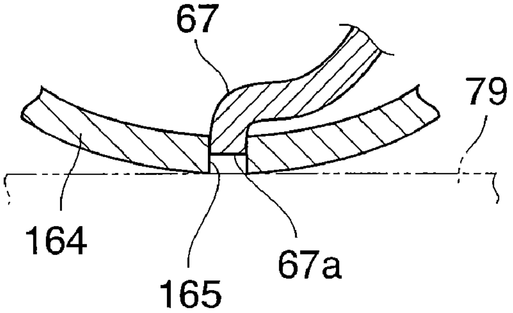
FIG. 7E is a fragmentary enlarged section view of a sliding contact assembly according to a second modification.

FIG. 7E shows in fragmentary enlarged section view a sliding contact assembly according to a second modification. As shown in FIG. 7E, the sliding contact assembly includes a curved elastic insulation member 164 corresponding to the insulation sheet 64 and the plate spring 61 of the assembly 60 of the above described embodiment. The insulation member 164 is disposed in contact with the lower guide bar 79, and formed with a hole 165 into which an electrically conductive member 67 of the sliding contact assembly is fixedly fitted, with a constant distance provided between a tip end 67*a* of the electrically conductive member 67 and the lower guide bar 79. Although not shown, the electrically conductive member 67 is at the same potential as the electrically conductive plating 28 via the fixture portion 82 of the operating element 80. The insulation member 164 may be one not having a spring property. In that case, a sheet similar to the insulation sheet 64 is used in combination with a plate spring. The plate spring cannot be used to constitute a discharge path but can be used to maintain the sheet in a curved state.

Also with the arrangement according to the second modification, a discharge path for high-voltage static electricity applied to the operating element 80 is formed between the tip end 67*a* of the electrically conductive member 67 and the lower guide bar 79 in the hole 165 formed in the insulation member 164 of the sliding contact assembly, whereby the effect of ensuring the provision of the discharge path, which is similar to that attained by the above described embodiment, can also be achieved in the second modification.

Figure 7F:
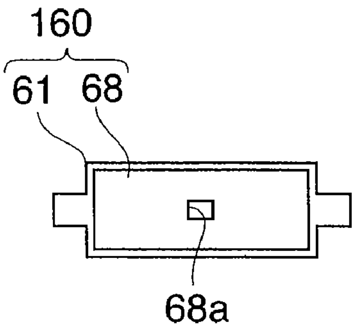
FIG. 7F is a front view of a sliding contact assembly according to a third modification.

In the above described embodiment, the sliding contact assembly 60 is comprised of the insulation sheet 64 and the plate spring 61 which are assembled together, but this is not limitative. FIG. 7F shows in front view a third modification of the sliding contact assembly. In this sliding contact assembly 160, an insulation coating 68 is applied to a surface of the plate spring 61 on the side facing the lower guide bar 79. The insulation coating 68 is formed with a non-coating portion 68*a*, which corresponds to the through hole 65 (see FIG. 5B), for ensuring the provision of a discharge path.

In the above described embodiment, the sliding contact assembly 60 is adapted to be in sliding contact with the lower guide bar 79. However, in a case where the movable unit 70 is not required to have both the movement guide function and the sliding contact-based braking function, the sliding contact assembly 60 can be made in sliding contact with any part of the apparatus that is fixedly disposed relative to the main case 10 and electrically conductive to the main case 10, as exemplarily shown in FIG. 8A to FIG. 8D.

Figure 8A:
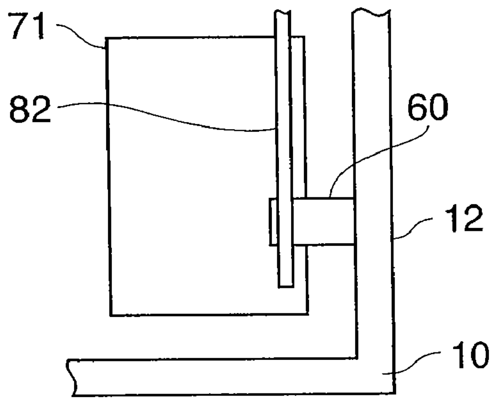
FIG. 8A is a side view schematically showing a modification of the sliding contact assembly.
Figure 8C:
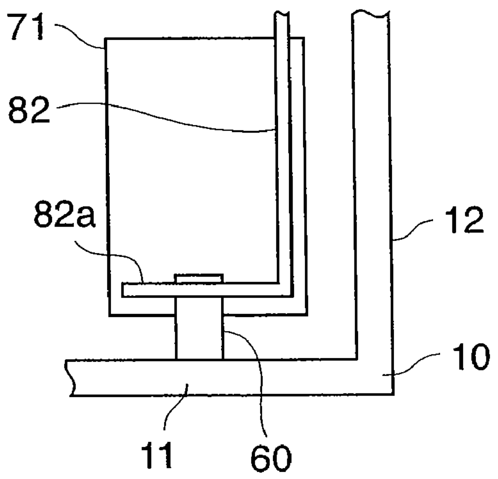
FIG. 8C is a side view schematically showing another modification of the sliding contact assembly.
Figure 8B:
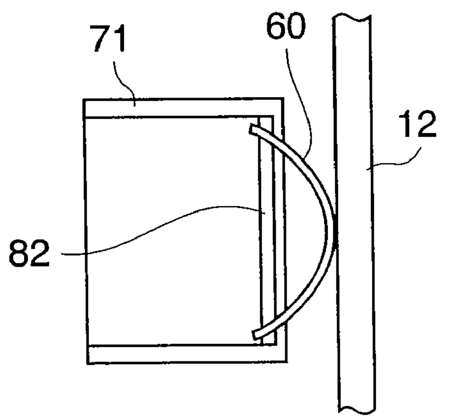
FIG. 8B is a plan view of the sliding contact assembly shown in FIG. 8A.

FIGS. 8A and 8B schematically show in side and plan views a modification of the sliding contact assembly 60. As shown in FIGS. 8A and 8B, the sliding contact assembly 60 is mounted to the fixture portion 82 of the operating element 80, with its curved convex side directed rearward, i.e., toward the main plate 12 of the main case 10. During the entire movement process of the movable unit 70, the convex portion of the sliding contact assembly 60 is in sliding contact with the main plate 12.

Figure 8D:
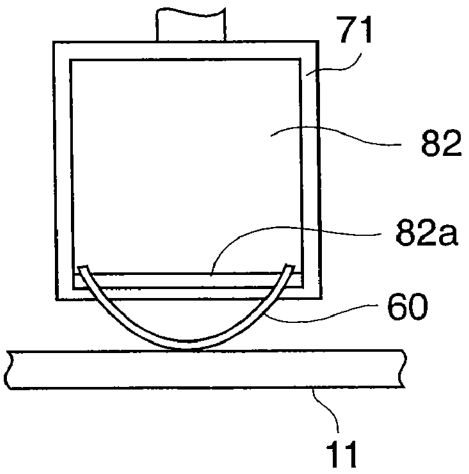
FIG. 8D is a plan view of the sliding contact assembly shown in FIG. 8C.

FIGS. 8C and 8D schematically show in side view and front view another modification of the sliding contact assembly 60. As shown in FIGS. 8C and 8D, the fixture portion 82 of the operating element 80 has a lower part thereof having an extended portion 82*a* which is extended forward. The sliding contact assembly 60 is mounted to the extended portion 82*a* of the fixture portion 82, with its curved convex side directed downward, i.e., toward the bottom plate 11 of the main case 10. During the entire movement process of the movable unit 70, the convex portion of the sliding contact assembly 60 is in sliding contact with the bottom plate 11.

In the above described embodiment, the insulation sheet 64, as an insulating part to achieve an insulating function in an electrical path extending from the operating element 80 to the main case 10, is disposed on the movable unit 70 side, i.e., on the moving side of the apparatus. However, as exemplarily shown in FIGS. 9A to 9D, the insulating part can be provided on the stationary side of the apparatus such as the main case 10, or on both the moving and stationary sides of the apparatus.

Figure 9A:
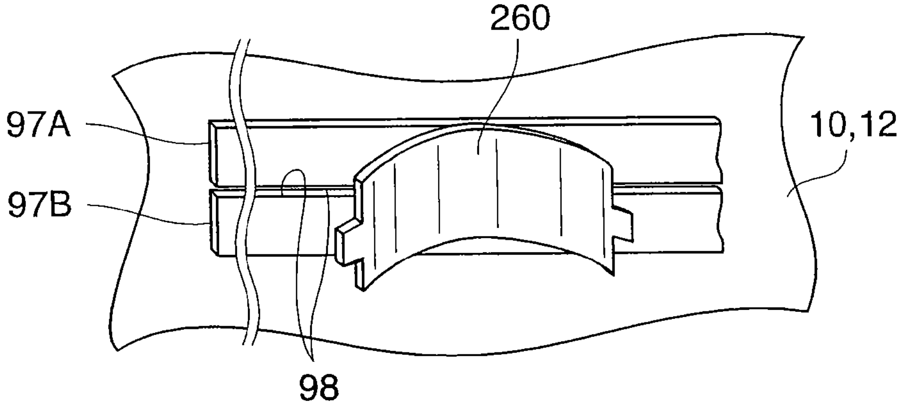
FIG. 9A is a perspective view schematically showing a modification of insulation parts.
Figure 9B:
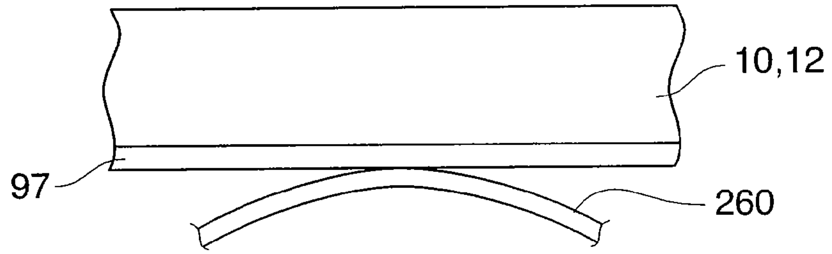
FIG. 9B is a plan view of one of the insulation parts shown in FIG. 9A.
Figure 9C:
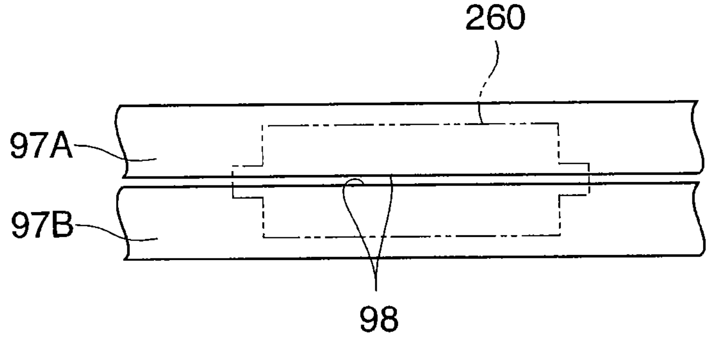
FIG. 9C is a front view of the insulation parts shown in FIG. 9A.

FIGS. 9A to 9C schematically show in perspective view, plan view, and front view a modification of the insulating part. As shown in FIGS. 9A to 9C, insulating parts 97 (97A and 97B) extending in the left-to-right direction are fixed onto a front surface of the main plate 12 of the main case 10. A slit 98 providing a discharge path like the through hole 65 (see FIG. 5B) is formed between the insulating parts 97A, 97B. Each insulating part 97 has a thickness nearly the same as that of the insulation sheet 64 (see FIG. 5B).

A sliding plate spring 260 equivalent to the sliding contact assembly 60 of the embodiment is only comprised of a plate spring, without having the insulation sheet 64 assembled thereto. The sliding plate spring 260 is mounted to the fixture portion 82 of the operating element 80, with its curved convex side directed rearward, i.e., toward the main plate 12 of the main case 10. During the entire movement process of the movable unit 70, the convex portion of the sliding plate spring 260 is in sliding contact with both the insulating parts 97A, 97B and maintained at a distance, corresponding to the thickness of the insulating parts 97, from the main plate 12.

With the above described arrangement, a discharge path for high-voltage static electricity applied to the operating element 80 is formed by the slit 98 between the sliding plate spring 260 and the main plate 12, whereby the effect of ensuring the provision of discharge path, similar to that attained by the above described embodiment, can be achieved.

Figure 9D:
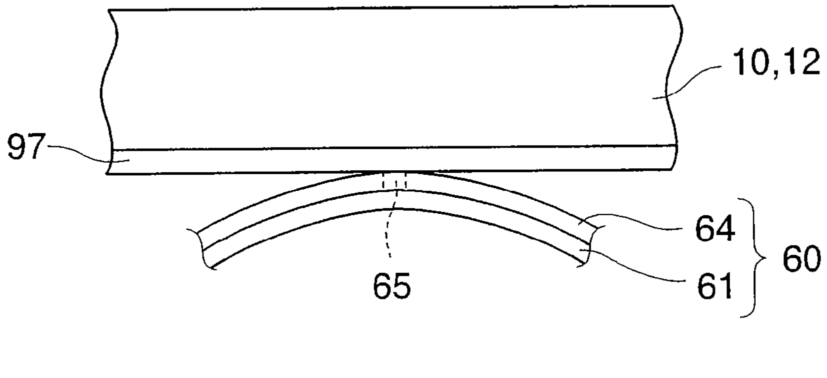
FIG. 9D is a plan view schematically showing another modification of the insulation part.

The insulating parts can be provided on both the moving and stationary sides of the apparatus, as shown in FIG. 9D in which another modification of insulating parts is shown. Specifically, on the stationary side of the apparatus, the insulating parts 97A, 97B are provided in the main plate 12 of the main case 10, as in the case shown in FIGS. 9A to 9C. On the moving side of the apparatus, there is provided the sliding contact assembly 60 (see FIG. 5C) comprised of the plate spring 61 and the insulation sheet 64. In that case, a discharge path is formed by the slit 98 between the insulating parts 97A, 97*b* and the through hole 65 formed in the insulation sheet 64. In that case, it is preferable that the distance between the main plate 12 and the plate spring 61, which is equal to the total thickness of the insulating parts 97 and the insulation sheet 64, should be set appropriately by making the total thickness equal to or less than about 100 μm.

In the above described embodiment and modifications, the pawls 63 are formed in the plate spring 61, and the notches 83*a* and the engagement holes 86 are formed in the fixture portion 82 of the operating element 80, thereby permitting the sliding contact assembly 60, 160, or 260 to be mounted to the fixture portion 82 of the operating element 80. However, this is not limitative so long as the sliding contact assembly 60 or the like can be maintained in a curved state. For example, instead of the notches 83*a* and the engagement holes 86, recesses or the like can be formed. The plate spring 61 can be formed with notches or engagement holes, and the fixture portion 82 can be formed with pawls. Two or more pawls or other engaged portions can be provided in each of left and right sides of one of the plate spring 61 and the fixture portion 82, and a corresponding number of notches or engagement holes or other engaging portions can be formed in another of the plate spring 61 and the fixture portion 82.

In a case where the touch sense function is not required, countermeasure for static electricity noise can easily be provided by maintaining the operating element 80 and the main case 10 at the same potential by, for example, removing the insulation sheet 64 from the sliding contact assembly 60.

What is claimed is:

1. A slide operation apparatus comprising:

a box body;

a movement guide electrically grounded, and provided in and longitudinally of said box body;

a movable unit having engaging portions and supported for sliding movement by said movement guide;

an operating element fixedly mounted to said movable unit and adapted to be operated, said operating element being electrically conductive;

a touch detection unit adapted to detect a change of electrostatic capacitance of said operating element generated when a user touches said operating element; and a plate spring having opposite ends thereof formed with engaged portions to correspond to the engaging portions of said movable unit, wherein said plate spring is adapted to be maintained in a curved state by having the engaged portions thereof engaged with the engaging portions of said movable unit, said plate spring having a curved convex portion thereof adapted to be in sliding contact with said movement guide of said box body during movement of said movable unit, wherein said plate spring is electrically connected to said operating element, and the curved convex portion of said plate spring is adapted to be in sliding contact with said movement guide via an insulation member, and wherein the insulation member comprises a discharge path for discharging to said movement guide when an excessively high voltage is applied to said operating element.

2. The slide operation apparatus according to claim 1, wherein the discharge path comprises a through hole into which said movement guide is fitted.

3. The slide operation apparatus according to claim 1, wherein the discharge path comprises a slit into which said movement guide is fitted.

4. The slide operation apparatus according to claim 1, wherein said box body is electrically grounded.

5. The slide operation apparatus according to claim 1, wherein said plate spring is electrically conductive to said operating element via said movable unit.

* * * * *